Figure 1:
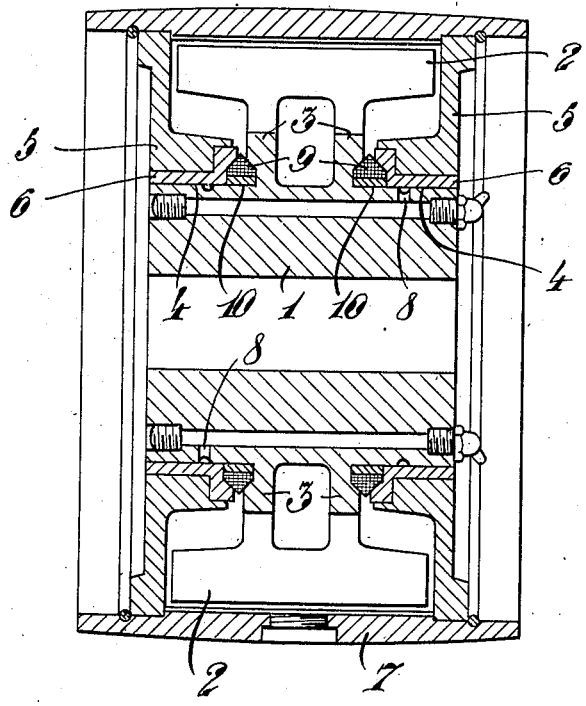

Nov. 8, 1938.  E. M. ÅGREN  2,135,654

PACKING DEVICE FOR ROTARY ELEMENTS

Filed Aug. 22, 1936

Inventor
Ernst Malmus Ågren
By his Attorney

Patented Nov. 8, 1938

2,135,654

UNITED STATES PATENT OFFICE 2,135,654

PACKING DEVICE FOR ROTARY ELEMENTS

Ernst Malcus Ågren, Stockholm, Sweden, assignor to Pulvis Aktiengesellschaft, Glarus, Switzerland, a corporation of Switzerland Application August 22, 1936, Serial No. 97,327
In Sweden September 5, 1935

2 Claims. (Cl. 308—36.2)

In slipping couplings in which a powdered or similar material forming the power transmission medium of the coupling is enclosed within a chamber provided between an inner coupling member having blades to engage said material and an outer coupling member rotatably mounted on said inner member, it is necessary to effect a tight seal between said chamber and the bearing surfaces of the coupling members, on the one hand, for preventing the powdered material from forcing its way out from said chamber to the bearing surfaces so as to damage same and, on the other hand, for preventing the lubricant from the bearing surfaces from squeezing into the said chamber so as to mix there with the powdered material, thereby rendering the latter more or less unfit for its purpose.

Heretofore, in order to obtain such a tightening effect, felt packing rings were generally used, which were so arranged as to present operating surfaces situated substantially in a plane at right angles to the axis of rotation of the coupling and so dimensioned as to be compressed axially to a certain extent in the mounting of the coupling. As, however, felt is a material of considerably varying elasticity and density, it is to be noted that packing rings having equal outer dimensions will not always present the same or even approximately the same density and it is, therefore, necessary in mounting the couplings to take care that packing rings of the proper density are obtained. This can only be realized by a testing operation and thus it may be necessary to reject several packing rings, before one is found having the proper density. This method means loss of time and loss of material. Assuming that a packing ring is inserted which, when uncompressed, presents the proper dimensions, such ring might be either too strongly compressed in the mounting of the coupling or too weakly compressed. In the former case, a great friction with the resulting production of heat and the risk of charring of the rings would result, whereby the tightening effect thereof would disappear, whereas in the case of too weakly compressed packing rings, their tightening effect would be insufficient from the very beginning. Furthermore, a packing ring too strongly compressed, especially when used in connection with couplings designed for small amounts of power, might interfere with the operation of the coupling, and at any rate, a comparatively great loss of power would result. In using well-known felt packings, an undesired additional compression of either packing ring may take place as a result of the coupling being subjected to forces tending to displace one coupling member axially with respect to the other, and in such case the same drawbacks as above set forth may appear, irrespective of the fact that the packing rings were of the proper density when mounted.

Other well-known packing devices are, likewise, based upon the subjecting of the packing material to an axially or substantially axially directed pressure which, however, is not produced by the action of the respective rotary elements themselves when mounted, but are produced by separate means. Said means may, frequently, be so designed as to permit adjustment of the pressure upon the packing device as desired. This may be effected either by subjecting the packing to the action of a gland which may be displaced axially by means of screws, or by subjecting the packing to an axial pressure afforded by springs of some appropriate kind, preferably helical springs, thereby securing an automatic tightening of the packing according as the packing material is worn away. Sometimes, a combination of both of these devices may be used. In all of the designs above described the axial pressure is used both when the operating surface of the packing is situated in a plane at right angles to the axis of the coupling and when the operating surface is coaxially positioned. All those well-known packing devices which exert a definite or adjustable tightening pressure, however, suffer from the drawback that they require a comparatively large space and, as a rule, can only tighten in a single direction.

The present invention has for its object to provide a packing device of the type exerting a definite tightening pressure, which does not require a larger space than that required by a packing ring of the usual design and which, moreover, will act effectively for both tightening directions. Principally, the packing device according to the invention differs from those already known by the fact that in the said first-mentioned device the packing material is subjected to a radially acting spring pressure which will be automatically maintained substantially constant, until the packing material is worn away to such an extent as to require replacement. Especially in case of slipping couplings using a powdered material as a power transmitting medium, the packing device according to the invention permits the use of a packing material which, contrary to the above said felt packings, is unaffected by a high heating to which the packing material may be subjected. A further advantage of the packing device according to the invention is that a relative axial displacement of the rotary elements between which the packing is inserted, does not cause any increased compression of the packing material and, as a result, does not produce any increased friction.

The packing device according to the invention comprises a packing ring and a split resilient ring engaging the packing ring to subject same to an inwardly or outwardly directed radial pressure in order to press the packing ring against the packing surfaces of the respective rotary elements, the packing ring having on its side remote from the resilient ring two operating surfaces formed as ring-shaped portions of conical surfaces which meet with their bottom edges along a circular line situated in a plane at right angles to the axis of rotation of the rotary elements.

The packing device according to the invention will now be described in one of its preferred forms and reference will be made to the accompanying drawing, in which the packing is shown as applied to a slipping coupling using a powdered power transmission medium. It is to be noted, however, that the invention is not restricted to such use but may be applied wherever it is desired to effect a tightening between rotary elements by means of a device requiring a small space and which is capable of tightening in two directions, and where it is desired to prevent an increased compression of the packing material as would otherwise arise as a result of a relative axial displacement of the rotary elements with respect to each other.

Figure 2:
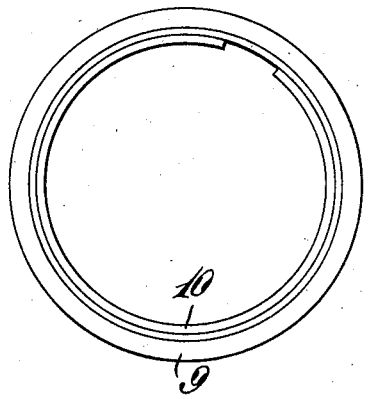
Figure 3:
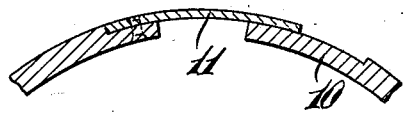
Figure 4:

In the drawing, Fig. 1 is an axial section of a slipping coupling of the type above set forth provided with two packing devices according to the invention. Fig. 2 is a side elevation of a packing device. Fig. 3 is a detail section at right angles to the axis of the coupling of a portion of the resilient ring of a packing device of large dimensions. Fig. 4 illustrates the manufacture of a packing ring.

With reference to Fig. 1, the numeral 1 indicates a hub adapted to be attached to a driving shaft. Said hub carries a number of blades 2 which are illustrated in the drawing as extending axially and connected by radial arms to a pair of annular flanges 3 of the hub. The end portions of the hub, beyond the flanges 3, form bearing surfaces 4 for receiving the corresponding bearing surfaces of a drum-shaped casing enclosing the hub and the blades, the end walls 5 of said casing being mounted on the bearing surfaces 4 by means of bushings 6. The cylindrical wall 7 of the casing may be formed as a belt pulley to permit transmission of power from the casing which represents the driven member of the coupling.

Leading to the bearing surfaces 4 are passages 8 for the supplying of a lubricant. The casing 5, 7 is adapted to be partially filled with a powdered or similar material adapted to act as a power transmission medium between the blades and the casing in well-known way. In order to prevent the powder from squeezing out from the interior of the casing to the bearing surfaces 4 and in order to prevent lubricant from passing from the bearing surfaces 4 into the casing, there is provided a packing 9 between each flange 3 and the opposite end surface of the respective end wall 5 or, as shown in the drawing, on the respective bushing 6. By this means the bearing surfaces are positively safeguarded against damage caused by the powdered material, and the powdered material, in turn, is positively held separated from the lubricant, so that the latter can not mix with the powder and render it more or less unfit for its purpose. Said packing ring 9 is of a triangular or substantially triangular cross section with its point directed outwardly, so that the ring will present two conical operative surfaces for engagement with corresponding conical surfaces of the flange 3 and the bushing 6. The packing rings 9 are kept in engagement with said last-mentioned surfaces by means of split resilient rings 10, each positioned between the bearing surface 4 and the cylindrical inner surface of the respective packing ring 9.

The diameter of the packing ring 9 and that of the resilient ring 10 are so chosen with respect to each other that the resilient ring, when in its released position, exactly fits in the packing ring before the packing has been inserted into the coupling, so that the two rings will form a unitary structure, as shown in Fig. 2, held together by frictional engagement. In this state, the diameter of the packing ring is somewhat greater than that of the conical packing surfaces of the coupling members and, likewise, the resilient ring presents a slightly larger diameter than that of the bearing surface 4. It is thus evident that the resilient rings with the surrounding packing rings may be easily put on the bearing surfaces 4 of the hub and pushed to its proper position thereon. After this has been done, the end walls 5 of the casing with their bushings 6 are mounted on the bearing surfaces 4 and pushed inwardly thereon. In its final position the bushings 6 will compress the packing rings to such an extent as to cause the resilient rings to close themselves completely or substantially completely, until they surround the surfaces 4 with a certain clearance sufficient to allow the hub 1 to rotate independently of the resilient rings, should the packing rings 9 be caused to rotate with the bushings 6 by friction. The closed resilient rings 10 exert in the complete coupling a radial pressure acting outwardly on the packing rings, thereby effectively pressing the operative surfaces thereof against the respective surfaces of the flanges 3 and the bushings 6. According as the packing rings are worn away the resilient rings will widen, thereby constantly maintaining a good tightening effect, until the resilient rings approach their released state. Only when this state is obtained, a replacement of the packing rings need take place.

It is to be noted that the resilient rings 10 should also be dimensioned with a view to securing a suitable axial clearance between them and the bushings 6 or the flanges 3, so that with the coupling members in their intermediate position with respect to each other, the resilient rings are only in contact with the packing rings.

Should the coupling be subjected to forces tending to displace the coupling members axially with respect to each other, one of the resilient rings 10 will act as a thrust bearing, after such a displacement has taken place as corresponds to the said axial clearance between the resilient rings and the corresponding contact surfaces of the bushings and the hub flanges. As said axial clearances may, of course, be made very small, the relative axial displacement of the coupling members will not perceptibly increase the friction between said members and the packing rings.

In couplings of larger dimensions, the gap between the cut ends of the resilient ring must be made so large that it may happen that the packing ring due to the compression taking place as a result of the mounting of the packing device, will be forced into the gap, thereby rendering the packing useless. In order to avoid this, the gap may be bridged by a member 11, as shown in Fig. 3, which is attached to the ring 10 on the one side of the gap and allowed to slide with its free end either on the outer cylindrical surface of the ring or in a cut-away portion thereof, as shown.

As material for the packing rings some suitable heat resisting material may be used, as for instance, suitably impregnated asbestos or the like. From such materials, which are commercially obtainable in the form of braids, yarn or wire, blanks for the packing rings may be manufactured, preferably, in the way illustrated in Fig. 4. From wire, yarn, etc. of a suitable thickness there is first wound a ring of a diameter that depends on the diameter of the packing ring to be manufactured, and round this ring, which is indicated by the number 12 in Fig. 4, the wire is then wound transversely, care being taken that the various windings 13 lie close together. By subjecting this pre-shaped ring to a high pressure in a mould, the ring may be transformed from the circular cross-section shown in Fig. 4 to the desired triangular cross-section, as for instance, that shown in Fig. 1.

Hereinbefore, a form of packing has been described in which the conical operative surfaces of each packing ring meet in an outwardly directed annular edge, the resilient ring being positioned inside the packing ring. It is to be noted, however, that the design may also be reversed, that is to say, the edge of the packing ring may be directed inwardly and the resilient ring may surround the packing ring. In the said last-mentioned case, the resilient ring will be strained by widening same due to the action of the pressure as exerted by the packing ring, when the latter is adjusted to its definite position.

What I claim is:—

1. In a coupling of the type described having a finely divided material as a power transmission medium, an inner member, cylindrical bearing surfaces thereon, an outer member rotatably mounted on said cylindrical bearing surfaces and surrounding the inner member, conical contact surfaces on said members, packings between said inner and outer members, each of said packings comprising a split resilient ring mounted on the respective bearing surface and said packings comprising a split resilient ring, said packing ring having on its outer side two conical operative surfaces engaging the conical contact surfaces of said members, the surfaces of the packing ring meeting along a circular line situated in a plane at right angles to the axis of rotation of said members, the resilient ring being arranged as a thrust bearing for maintaining the members in a proper axial position with relation to each other so as to prevent the occurrence of an increase of pressure with resulting increase of friction between the packing rings and said members.

2. A packing for relatively rotatable elements including, in combination, a packing ring having angularly disposed sliding surfaces approaching each other along a circular line disposed in a plane at right angles to the axis of rotation of said elements, said elements being formed with contact surfaces corresponding to said sliding surfaces and with thrust surfaces, and a radially resilient ring engaging said packing ring on the surface thereof opposite to said sliding surfaces and arranged to exert a radial pressure on said packing ring for pressing said sliding surfaces against the contact surfaces of said elements, said radially resilient ring being substantially rigid in axial direction and disposed between the thrust surfaces of said elements to limit axial displacement of said elements toward each other.

ERNST MALCUS ÅGREN.